United States Patent
Fulghum et al.

(10) Patent No.: US 7,185,111 B2
(45) Date of Patent: Feb. 27, 2007

(54) AVAILABLE SERVER DETERMINATION

(75) Inventors: Patrick Weldon Fulghum, Boise, ID (US); Theresa A. Burkes, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 691 days.

(21) Appl. No.: 10/125,507

(22) Filed: Apr. 19, 2002

(65) Prior Publication Data

US 2003/0200338 A1    Oct. 23, 2003

(51) Int. Cl.
*G06F 15/16*    (2006.01)
(52) U.S. Cl. ...................................... 709/248; 713/400
(58) Field of Classification Search ................ 709/248, 709/203; 370/503; 713/400
See application file for complete search history.

(56) References Cited

U.S. PATENT DOCUMENTS

| | | | |
|---|---|---|---|
| 5,602,992 A * | 2/1997 | Danneels ..................... | 709/248 |
| 5,812,749 A * | 9/1998 | Fernandez et al. ............. | 714/4 |
| 5,968,133 A * | 10/1999 | Latham et al. ............... | 709/248 |
| 6,094,672 A | 7/2000 | Willie et al. ................. | 709/202 |
| 6,311,283 B1 | 10/2001 | Gonzalez ..................... | 713/400 |
| 6,327,274 B1 * | 12/2001 | Ravikanth ................... | 370/516 |
| 6,581,110 B1 * | 6/2003 | Harif et al. ................. | 709/248 |
| 6,885,641 B1 * | 4/2005 | Chan et al. ................. | 370/252 |
| 2002/0129291 A1 * | 9/2002 | Gonzalez ..................... | 713/400 |
| 2002/0143998 A1 * | 10/2002 | Rajagopal et al. .......... | 709/248 |
| 2003/0123491 A1 * | 7/2003 | Couillard ..................... | 370/508 |
| 2003/0206554 A1 * | 11/2003 | Dillon ........................ | 370/432 |

OTHER PUBLICATIONS

Mills, David L.; "Internet Time Synchronization: The Network Time Protocol", IEEE Transactions on Communications, vol. 39, No. 10, Oct. 1991, pp. 1482-1493.

* cited by examiner

*Primary Examiner*—Bunjob Jaroenchonwanit
*Assistant Examiner*—Duyen Doan

(57) ABSTRACT

In a method, a first available server is determined among one or more servers in response to a request packet. The network time from the first available server is applied to a client to synchronize its system clock.

21 Claims, 7 Drawing Sheets

AVAILABLE SERVER DETERMINATION

FIELD OF THE INVENTION

This invention relates generally to computer networks. More particularly, the invention pertains to synchronization of time within a network.

BACKGROUND OF THE INVENTION

Conventional computer systems typically maintain an internal clock (e.g., a system clock) to keep track of the date and the time of day. Accurate time and date measurements are required in a wide variety of applications, e.g., managing and tracking electronic mail (email), timing back-ups of data on a network, synchronizing communications between clients and servers, managing multimedia teleconferences, etc. Time clocks maintained by most computer systems tend to be subject to a certain amount of error, or "drift". Therefore, it becomes necessary to synchronize such clocks to an accurate reference clock at various times to thereby increase accuracy in applications.

A number of solutions have been developed to synchronize the system clocks of computer systems. In one solution the user of a computer system manually adjusts the clock whenever the clock appears to have drifted. This technique, however, is both inconvenient for the user and subject to its own inaccuracies.

A more sophisticated solution makes use of a server operating on a network, such as the Internet. The server computer system maintains a highly accurate time clock, such as an atomic clock, and provides accurate time readings to other computer systems on the network using a communication protocol such as Network Time Protocol (NTP) or Simple Network Time Protocol (SNTP). In this type of arrangement, a client computer system may send a request for an accurate time reading via the Internet to an NTP or SNTP server when it is necessary to synchronize its internal clock. The request may be routed to one of a number of secondary servers that function as intermediaries between the client systems requiring clock synchronization and a primary NTP or SNTP server. The use of such secondary servers is generally intended to reduce the loading on the primary NTP or SNTP server. A primary NTP or SNTP server may be maintained, for example, by a government entity, while access to the primary NTP or SNTP servers is regulated by secondary NTP or SNTP servers maintained, for example, by universities and business enterprises, for use by their students and employees, respectively.

The known solutions, however, suffer from certain drawbacks and disadvantages. An exemplary problem associated with known NTP and SNTP based clock synchronization techniques is that the secondary servers may tend to become overloaded by synchronization requests. This problem may be more common in those secondary servers that serve large networks. A large business enterprise, for example, may maintain a secondary server that serves hundreds or thousands of client systems. Thus, the occurrence of a large number of synchronization requests within a short period of time may significantly slow down operation of the secondary server. This effect is undesirable, especially if the secondary server is also responsible for other services.

Other problems associated with known clock synchronization techniques are inconvenience to the user and disruption of the user's activities. Synchronization of a computer system's time clock is typically performed under the control of network application software executing on the computer system, which operates the computer system's communication device to access a network server. In a home environment, in which access to the Internet is typically provided through the use of a modem, the network software must perform a modem dial out routine to establish a connection to the Internet. It is undesirable for a computer system to initiate a dial out on its own whenever clock synchronization is required, as doing so may be disruptive to the user. Consequently, network software products are commonly configured to synchronize the time clock only when it is determined that an active network connection exists. This approach has the disadvantage that, in a home situation, the time clock is synchronized only when the user actually accesses the Internet, which may not be sufficiently frequent to maintain the accuracy of the clock.

SUMMARY OF THE INVENTION

According to one embodiment, the present invention pertains to a method for synchronizing a clock in a client with a network time from a server. In the method, a request packet is transmitted and one or more data packets from at least one server is received in response to the request packet. The one or more data packets are sorted based on the order of receipt of each of the one or more data packets. A test is performed to determine the first synchronized packet from the one or more data packets. In addition, a first synchronized server is selected in response to finding the first synchronized packet.

According to another embodiment, the present invention pertains to an apparatus for synchronizing a system clock in a client. The apparatus includes means for transmitting a request for time synchronization; means for receiving responses from a plurality of servers; means for determining; means for storing the order of receipt of the responses; and means for determining whether any of the responses is from a synchronized server.

According to yet another embodiment, the present invention relates to a system for synchronizing a system clock in a client. The system includes a time sync module configured for storage and execution on the client. In addition, the time sync module is operable to transmit a request for time synchronization to one or more servers and to receive responses from the one or more servers. The time sync module is further configured to determine whether the responding servers are synchronized and the order in which the servers responded, and to apply the network time from the first synchronized server to respond.

According to a further embodiment, the present invention pertains to a method. In the method, a first available server is determined among one or more servers in response to a request packet. In addition, a network time from said first available server is applied.

In accordance with another embodiment, the present invention relates to a computer readable storage medium on which is embedded one or more computer programs. The one or more computer programs implements a method and includes a set of instructions for determining a first available server among a plurality of servers in response to a request packet and applying a network time from said first available server.

BRIEF DESCRIPTION OF THE DRAWINGS

The accompanying figures incorporated in and forming part of the specification, illustrate several aspects of the present invention, and together with the description serve to explain principles of the invention. In the figures.

DETAILED DESCRIPTION OF THE INVENTION

Figure 1:
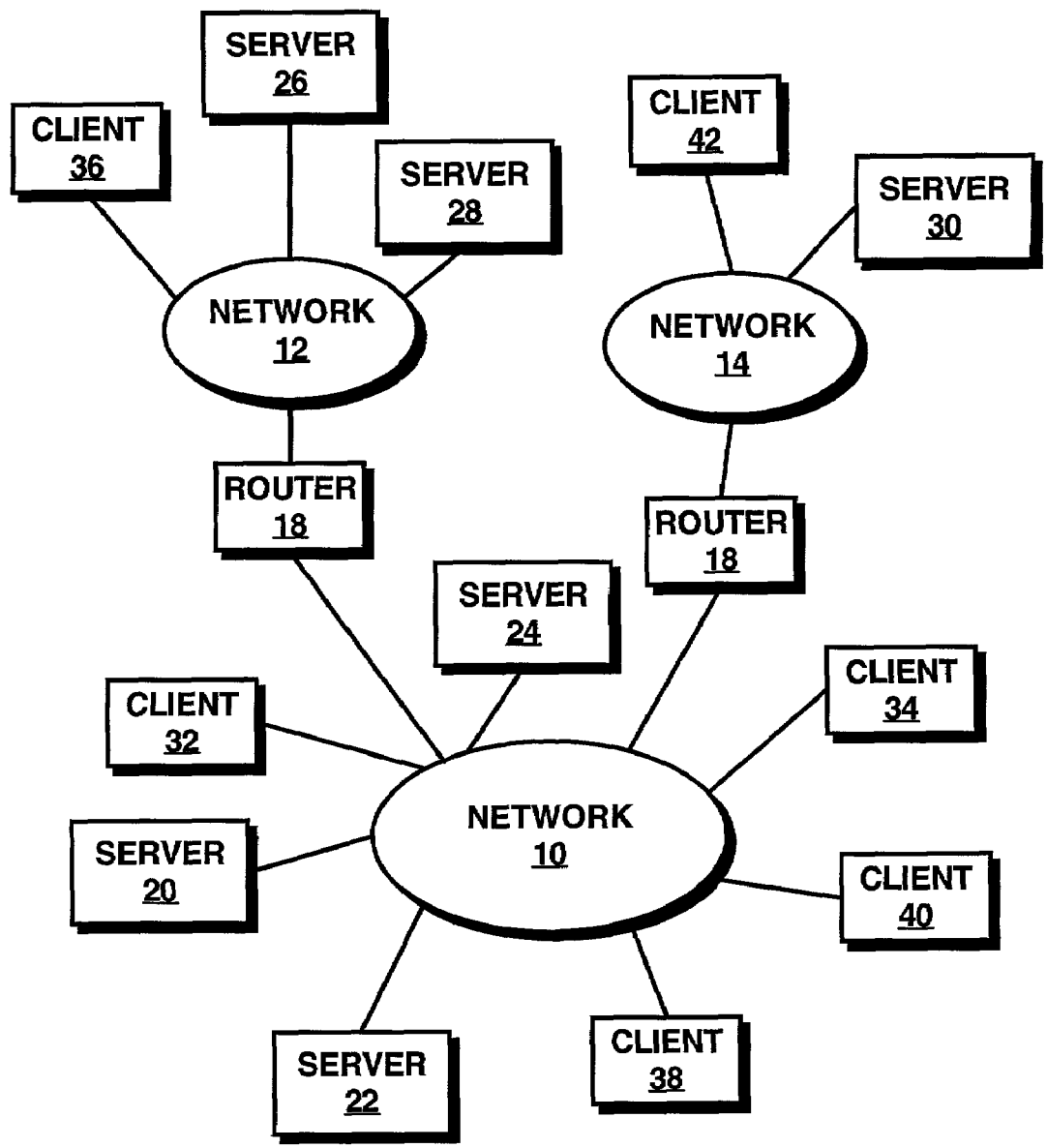
FIG. 1 illustrates a simplified diagram of an exemplary network according to an embodiment of the invention.

For simplicity and illustrative purposes, the principles of the present invention are described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

An embodiment of the present invention pertains to synchronizing clocks in network devices, e.g., printers, photocopiers, personal computers, and like devices. More particularly, a time synchronization (hereinafter referred to as a "time sync") module executing on a network device may be configured to synchronize the system clock of a network device to a network server. The time sync module may perform the synchronization utilizing the Simple Network Time Protocol (SNTP). The time sync module may operate in conjunction with the client software executing on the network device. Alternatively, the time sync module may be integrated within the client software.

In accordance with one embodiment of the present invention, a time sync module may be configured to broadcast (or multicast) a synchronization request message to a network, where the network may contain multiple network servers. The time sync module may be configured to analyze data packets from responding network servers to determine if a responding server is synchronized. If the time sync module determines that a responding server is synchronized, the time sync module may use the time from a response packet of the first responding synchronized server and update the system clock for the network device.

In another embodiment of the present invention, a time sync module may be configured to broadcast (or multicast) a synchronization request message to a network, where the network may contain multiple network servers. The time sync module may sort the response packets from the responding network servers. The time sync module may organize the response packets into two groups on the basis of whether the server is synchronized: (1) if the responding server is synchronized, the server address and corresponding network time is placed into one ordered group based on order of receipt; and (2) if the responding server is non-synchronized, the server address and corresponding network time is placed in a second ordered group based on order of receipt.

If the time sync module receives response packets from synchronized servers, the time sync module may be configured to calculate an average time and standard deviation for the synchronized servers. The time sync module may then choose the first synchronized server that falls within a given multiple of the calculated standard deviation by order in the group. The time sync module may subsequently use the time from the selected network server to update the system clock.

If the time sync module determines that only non-synchronized network servers responded, the time sync module may be configured to calculate an average time and standard deviation for the non-synchronized servers. The time sync module may then choose the first non-synchronized server that falls within a given multiple of the calculated standard deviation by order of receipt in the group. The time sync module may subsequently use the time from the selected network server to update the system clock.

Accordingly, a network device may receive replies from network servers that are substantially less busy and closest (in network terms) before the network device receives replies from more heavily loaded or network servers that are located at relatively long distances, by utilizing an embodiment of the time sync module. By selecting the first synchronized server that falls within the selected multiple of the standard deviation, the load on multiple servers and the load on the network may be better balanced. In a large network configuration, this may substantially reduce traffic beyond a subnet.

FIG. 1 illustrates a block diagram of an exemplary network 10 where an embodiment of the present invention may be practiced. It should be readily apparent to those of ordinary skill in the art that the network 10 depicted in FIG. 1 represents a generalized schematic illustration and that other components may be added or existing components may be removed or modified without departing from the scope of the present invention.

As shown in FIG. 1, the network 10 may be a local area network (LAN), a wide area network, a global telecommunications system, e.g., the Internet, or some combination thereof. In addition, the network 10 may include a plurality of sub-networks 12 and 14 connected to form the network 10 via routers 18. Alternatively, network switches, bridges and other similar devices may be substituted or used in conjunction with the routers 18.

The network 10, including the sub-networks 12 and 14, may include a plurality of servers 20–30. Some of the servers 20–30 may comprise servers, e.g., primary or secondary servers. The remaining servers 20–30 may be designed to perform network services (e.g., provide software applications, data storage, etc.) in the network 10. In addition, some of the servers 20–30 may perform a combination of various functions (e.g., time services, data storage, etc.).

The network 10 may also include a plurality of network devices 32–42. The network devices 32–42 may include personal computers, laptops, personal digital assistants, printers and like devices, that may be attached to the network 10 through respective network interfaces.

The network 10 and the sub-networks 12 and 14 may provide communication services to the clients 32–43 by wired protocol such as IEEE 802.3, token ring, X.25, etc., wireless protocols such as Cellular Digital Packet Data, Mobitex, IEEE 801.11b, Wireless Application Protocol, Global System for Mobiles, etc., or a combination thereof.

Figure 2:
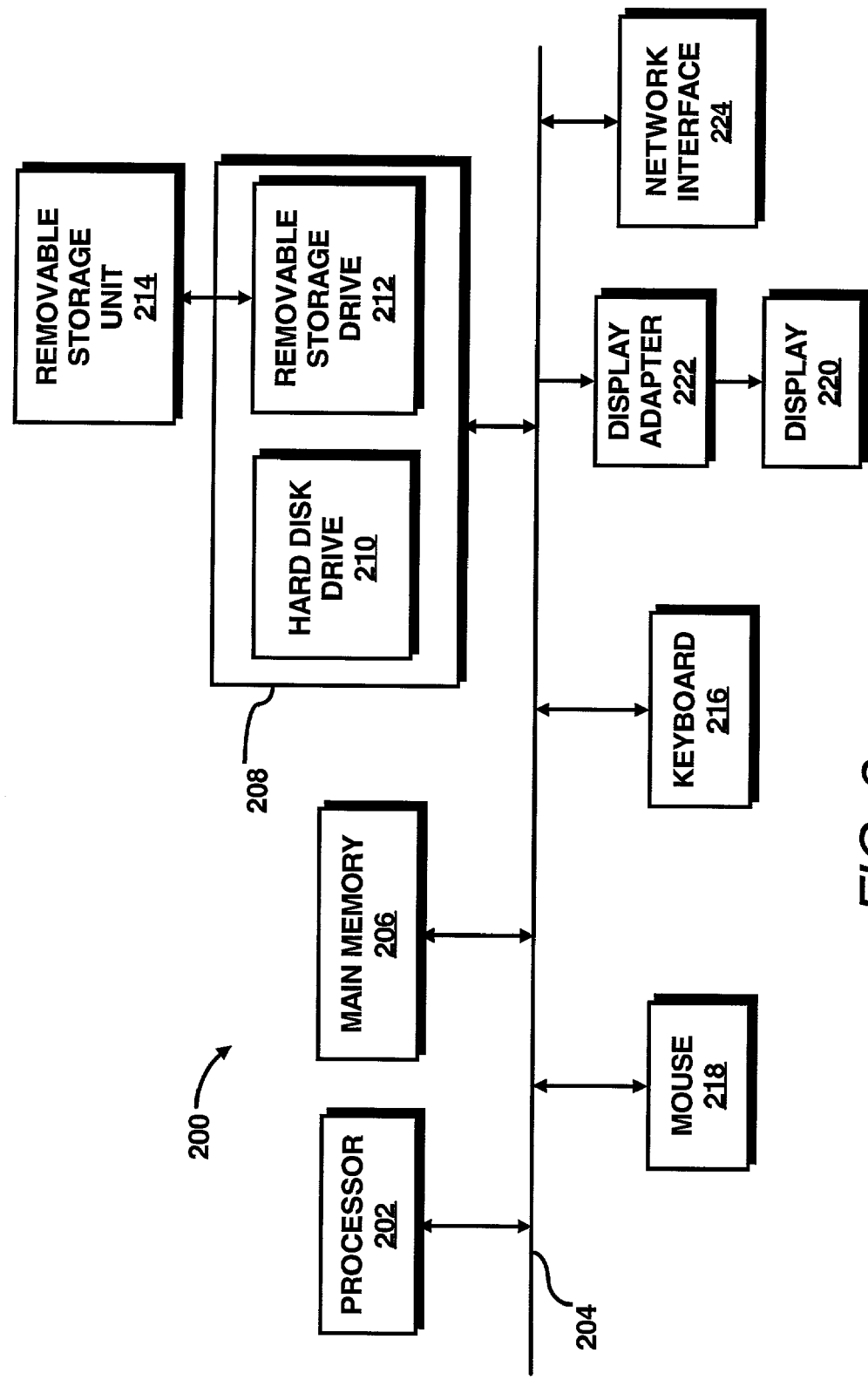
FIG. 2 illustrates a block diagram of an exemplary computing platform in which an embodiment of the invention may be implemented.

FIG. 2 illustrates a block diagram of an exemplary computing platform 200 that is representative of some or all of the network devices 32–42 and/or servers 20–30 in FIG. 1. It should be readily understood by those of skill in the art that many variations may be made upon the illustrated configuration consistent with the techniques described herein. For example, for a printer, the computing platform 200 may be changed to omit a mouse and a removable storage unit.

The computing platform 200 includes one or more processors, such as processor 202, configured to provide an execution platform for a network device, such as network device 32 (FIG. 1). Commands and data from the processor 202 may be communicated over a communication bus 204.

The computing platform 200 also includes a main memory 206, preferably Random Access Memory (RAM), where the software for the network device 32 may be executed during runtime. In addition, a secondary memory 208 may also be included in the computing platform 200. The secondary memory 208 includes, for example, a hard disk drive 210 and/or a removable storage drive 212, representing a floppy diskette drive, a magnetic tape drive, a compact disk drive, and the like. The removable storage drive 212 may store a copy of the software for the storage device 32. In addition, the removable storage drive 212 may read from and/or write to a removable storage unit 214, e.g., floppy disk, compact disc, etc.

A user may interface with the computing platform 200 through a keyboard 216, a mouse 218, and a display 220. A display adapter 222 may be interfaced between the communication bus 204 and the display 220 to receive display data from the processor 202 and to convert the display data into display commands visible on the display 220. The computing platform 200 may interface with a network through a network interface 224.

Some or all aspects of the time sync module described herein may be embodied in software. For instance, the time sync module may be carried out in a client 32–42 in response to its processor 202 executing sequences of instructions contained in memory, e.g., memory 208. The instructions may be executed from the main memory 206, e.g., RAM, and may be loaded from a persistent store, such as a mass storage device and/or from one or more other remote network devices. In the latter case, the network device may transmit a sequence of instructions over a network to a remote network device in response to a message transmitted to the network device. As the network device receives the instructions via the network connection from the remote network device, the network device stores the instructions in memory, e.g., for later execution or for execution during receipt of the instructions.

Figure 3:
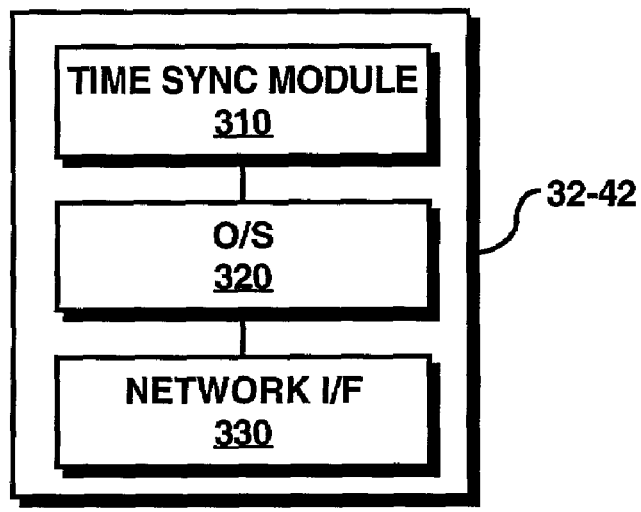
FIG. 3 illustrates an exemplary block diagram of an architecture for a network device shown in FIG. 1 in accordance with an embodiment of the invention.

FIG. 3 illustrates a block diagram of an exemplary architecture 300 for a network device 32–42 shown in FIG. 1 in accordance with an embodiment of the invention. It should be understood to those of ordinary skill in the art that the architecture 300 illustrated in FIG. 3 represents a generalized illustration and that other components may be added or existing components may be removed or modified without departing from the scope of the present invention.

As shown in FIG. 3, the architecture 300 includes a time sync module 310, an operating system 320, and a network interface 330. The time sync module 310 may be configured to send (e.g., multicast, broadcast, etc.) a synchronization request message to a plurality of network servers, e.g., servers 20–30, when invoked. The time sync module 310 may also be configured to analyze response packets from responding network servers to determine if the responding server is synchronized. As is described in greater below, the analysis of the response packets may be used to determined whether the responding servers are synchronized or non-synchronized. If the time sync module 310 determines that the server is synchronized, the time sync module 310 may use the time from a response packet and update the system clock for the client executing the time sync module.

In another embodiment of the present invention, the time sync module 310 may be configured to send a synchronization request message to a plurality of servers, e.g., servers 20–30. The time sync module 310 may sort the response packets from the responding network servers according to the order of their receipts. The time sync module 310 may organize the response packets into two groups on the basis of the synchronization of the responding server: (1) if the responding server is synchronized, the server address and corresponding network time may be placed in one ordered group based on the order of receipt; and (2) if the responding server is non-synchronized, the server address and corresponding network time may be placed in a second ordered group based on the order of receipt.

The time sync module 310 may be configured to calculate an average time and standard deviation from the data packets received from the synchronized servers. The time sync module 310 may then choose the first synchronized server that falls within a given multiple of the calculated standard deviation by order in the group. The time sync module 310 may subsequently use the time from the selected network server to update the system clock.

If the time sync module 310 determines that no synchronized network servers responded, the time sync module 310 may be configured to calculate an average time and standard deviation for the non-synchronized servers. The time sync module 310 may then choose the first non-synchronized server that falls within a given multiple of the calculated standard deviation by order of receipt in the group. The time sync module 310 may subsequently use the time from the selected network server to update the system clock.

The time sync module 310 may further be configured to interface with the operating system 320. More specifically, the time sync module 310 may be interfaced with the operating system 320 through an application program interface (API, not shown). The operating system 320 may be configured to manage the software applications, data and respective hardware components (e.g., displays, disk drives, etc.) of the network device, e.g., 32–42. MICROSOFT WINDOWS family of operating systems, UNIX, HEWLETT-PACKARD HP-UX, LINUX, RIM OS, and other similar operating systems may implement the operating system 320.

The operating system 320 may be coupled with the network interface 330 through a device driver (not shown). The network interface 330 (e.g., network interface 224 shown in FIG. 2) may be configured to provide a communication port for network device, e.g., 36, over the network 10 (shown in FIG. 1). The network interface 330 may be implemented using a network interface card, a wireless interface card or other similar input/output device.

Figure 4A:
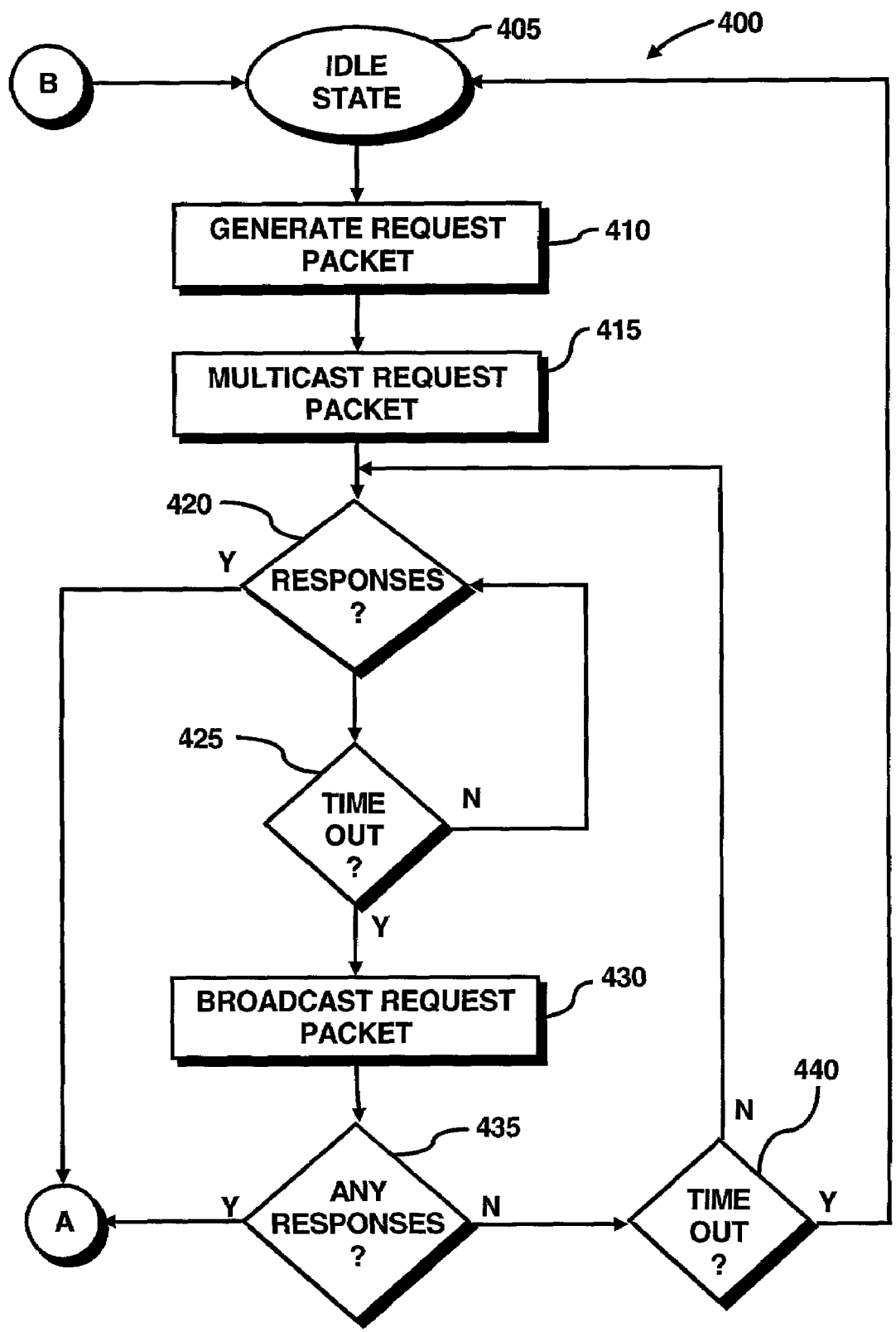
FIGS. 4A–4B, collectively, illustrate a flow diagram for an operational mode of the time sync module shown in FIG. 3 according to an embodiment of the invention.
Figure 4B:
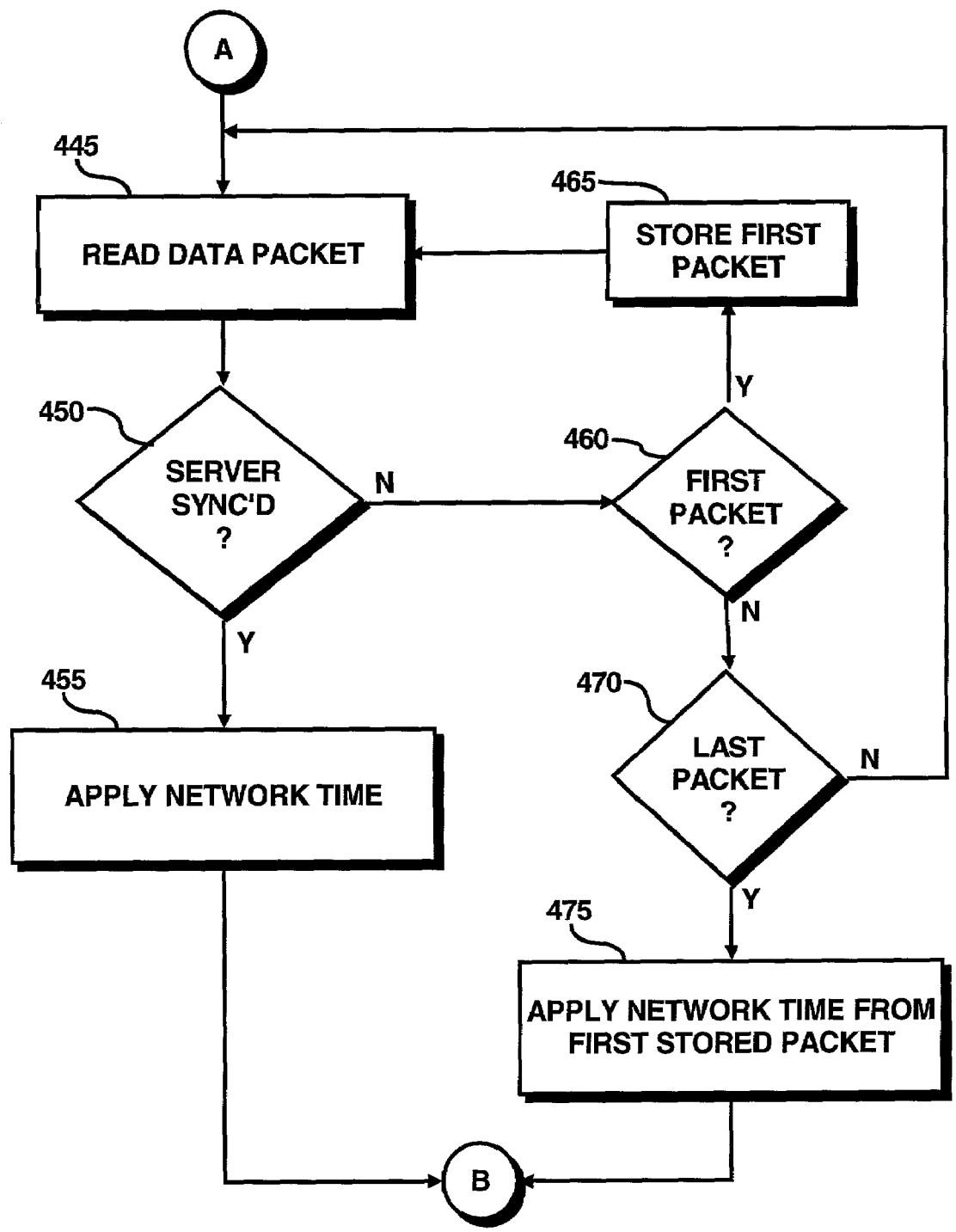

FIGS. 4A–4B, collectively, illustrate a flow diagram for an exemplary operational mode 400 of the time sync module 310 shown in FIG. 3 according to an embodiment of the invention. In addition, FIGS. 5A–5B, collectively, illustrate a flow diagram for an exemplary operational mode 500 of the time sync module 310 shown in FIG. 3 according to another embodiment of the invention. It should be readily apparent to those of ordinary skill in the art that the operational modes 400 and 500 represent generalized illustrations and that other steps may be added or existing steps may be removed or modified without departing from the scope of the present invention.

The steps illustrated in the operational modes 400 and 500 may each be contained as a utility, program, subprogram, in any desired computer accessible medium. In addition, the operational modes 400 and 500 may each be embodied by a computer program, which can exist in a variety of forms both active and inactive. For example, each of the operational modes 400 and 500 may exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD-ROM or via Internet download. In a sense, the Internet itself, as an abstract entity, is a computer readable medium. The same is true of computer networks in general. Although particular reference is made in the following descriptions of FIGS. 4A–4B and FIGS. 5A–5B to the sync module 310 illustrated in FIG. 3 as performing certain functions, it is to be understood that those functions may be performed by any electronic device capable of executing the above-described functions.

Referring first to FIG. 4A, the time sync module 310 may be configured to be in an idle state at step 405. The time sync module 310 may be configured to generate a request packet at step 410. More particularly, the request packet may be generated by instantiating an SNTP packet with zeros. In addition, the time sync module 310 may be configured to set the version field to 3 and also the mode field to 3 of the SNTP packet. At step 415, the time sync module 310 may be configured to multicast the request packet, for example, with an address of 244.0.0.1 on port 123. Alternatively, the time sync module 310 may be configured to format the request packet in any known manner to perform a multicast to a plurality of servers.

The time sync module 310 may be configured to determine whether any response packets have been received at step 420. At step 425, it is determined whether any responses have been received within a predetermined amount of time. Thus a timeout may be implemented by a select ( ) command. Alternatively, a timer, e.g., a timer module (not shown) may be provided in the network device 32–42, may be initiated upon performance of the multicast. It should be understood that the predetermined amount of time may be set according to individual preferences and may vary depending upon various factors, e.g., time synchronization optimization, load on the servers, etc.

If a time out has not occurred at step 425, the operational mode 400 may return to step 420 to determine whether any response packets have been received. This process may continue until a time out occurs at step 425.

If at least one response packet is not received within the predetermined amount of time, the time sync module 310 may be configured to perform a broadcast of the request packet, for example, with an address of 255.255.255.255 on port 123, at step 430. It should be understood that the broadcast may be performed with any reasonably suitable address and port. At step 435, it is determined whether any response packets have been received. At step 440, it is determined whether a time out has occurred. In this regard, a timer, e.g., a timer module (not shown) may be provided in the network device 32–42, may be initiated upon performance of the broadcast. Alternatively, the time measurement may be a continuation of the timer initiated upon the performance of the multicast. In any respect, it should be understood that the predetermined amount of time may be set according to individual preferences and may vary depending upon various factors, e.g., time synchronization optimization, load on the servers, etc.

If a time out has not occurred at step 440, the operational mode 400 may return to step 420 to determine whether any responses from the multicast (step 415) or the broadcast (step 430) have been received. This process may continue until a time out occurs at step 440. If a time out does occur, the operational mode 400 may return the time sync module 310 to the idle state at step 405.

With reference now to FIG. 4B, if at least one response is received by the time sync module 310 at step 420 or step 435, the data packet(s) from the server(s) associated with the received response packet(s) may be read by the time sync module 310, at step 445. The data packet may contain information pertaining to the server address that sent the response as well as an indication of whether the time is synchronized. The time sync module 310 may receive one or more responses at step 420 or step 435.

At step 450, the data packet is used to determine whether any of the responding servers is synchronized. In one embodiment, the server may be determined to be synchronized by determining whether the leap indicator field is zero (0), the mode field is four (4), the version field is either three (3) or four (4), the stratum field is in the range of 1–15 inclusive, and the transmit timestamp indicates that the time is greater than Jun. 1, 2001. The above-outlined information may be read from the received data packet(s). It should be understood that a server may be determined as being synchronized in any other reasonably suitable manner generally known to those of ordinary skill in the art.

If the responding server is synchronized, the network time from that server is applied to update the system clock at step 455. Following application of the network time, the time sync module 310 may be configured to return to the idle state (step 405).

If none of the responding servers is determined to be synchronized, i.e., the responding server(s) is determined to be non-synchronized, at step 450, it may be determined whether the data packet received from that server is the first packet received, e.g., the first server to respond, at step 460. If the data packet is determined to be the first packet, at step 465, the information contained in the data packet is stored, for example in the main memory 206 (FIG. 2). The time sync module 310 may then read a data packet from another server at step 445 and determine whether that server is synchronized, for example, in the manner described hereinabove.

At step 460, if it is determined that the data packet is not the first packet, e.g., after repeating steps 445 and 450 at least one time, then the time sync module 310 may determine whether the data packet is the last packet received at step 470. If the data packet is not the last packet, then another data packet may be read at step 445 to determine if the responding server is synchronized. Again, if it is determined that the server is synchronized, the network time from that server may be applied to the system clock at step 455.

In this regard, the system clock of the network device may correspond to the network time of the first synchronized server to respond.

If, at step 470, the data packet is determined to be the last data packet, then the network time from the first stored packet (from step 465) may be applied to the system clock of the network device at step 475. Following application of the network time from the first non-synchronized server, the time sync module 310 may be configured to return to the idle state (step 405).

Figure 5A:
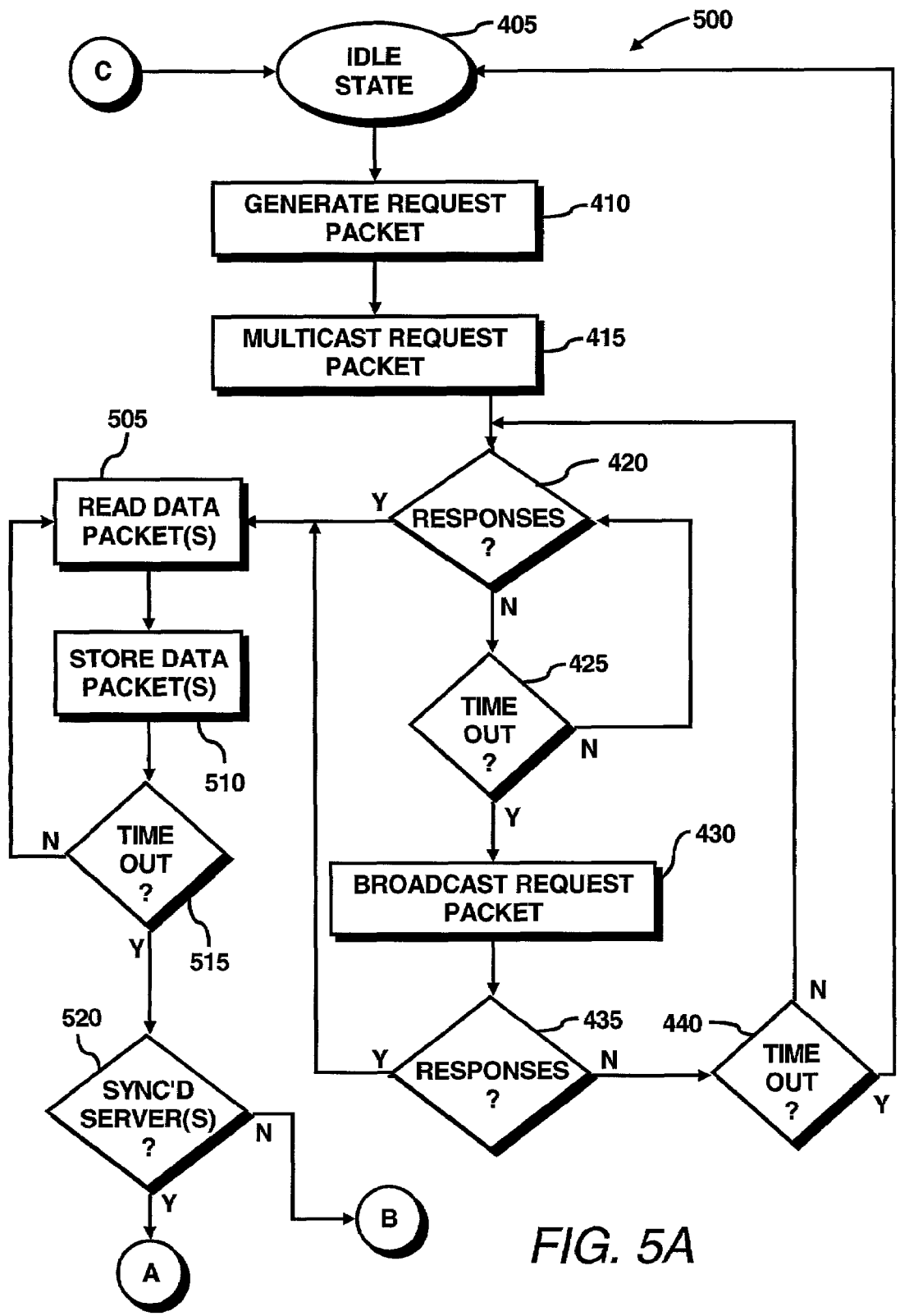
FIGS. 5A–5B, together, illustrate a flow diagram according to another embodiment of the present invention.
Figure 5B:
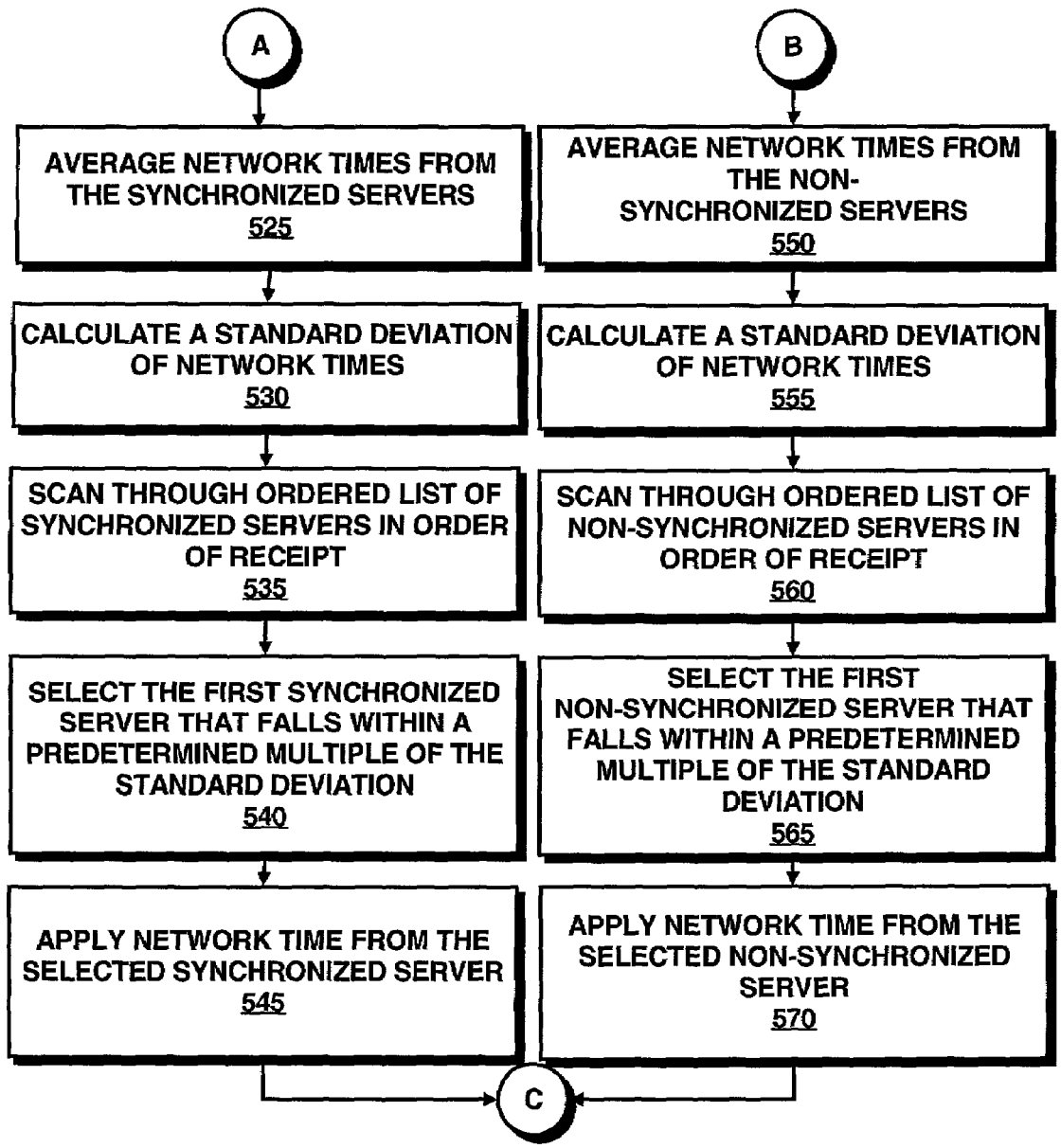

FIGS. 5A and 5B, collectively, illustrate a flow diagram of an operational mode 500 according to another embodiment of the invention. Steps 405–440 identical to those steps illustrated in FIG. 4A and described hereinabove. Therefore, a detailed description of steps 405–440 in FIG. 5A is omitted for convenience. Instead, the description provided hereinabove with respect to FIG. 4A is relied upon to support the following description of FIG. 5A.

In FIG. 5A, beginning at step 420, if any responses are received from any servers, the data packet(s) from the server(s) is read at step 505. At step 510, the data packet(s) is stored in a memory, e.g., memory 210 (FIG. 2). The order of receipt of the data packets and their corresponding servers may also be stored in memory. In addition, the servers may be stored in two categories, one category for synchronized servers and another one for non-synchronized servers. Thus, for example, a database, linked-list, table, etc., (not shown) may be created in the memory 206 with inputs of synchronized servers arranged in the order they were received by the time sync module 310 and non-synchronized servers arranged in the order they were received. It should be understood that the instant embodiment of the invention includes those situations where all of the responding servers are synchronized or non-synchronized.

This process may continue until a time out occurs, as indicated at step 515. More specifically, prior to the occurrence of the time out, additional data packets from the servers may be read (step 505) and stored (step 510). As stated hereinabove, a timer, e.g., a timer module (not shown) may be provided in the network device 32–42, may be initiated upon receipt of a first data packet. It should be understood that the predetermined amount of time may be set according to individual preferences and may vary depending upon various factors, e.g., time synchronization optimization, load on the servers, etc.

After the occurrence of the time out at step 515, the time sync module 310 may determine whether any of the responding servers are synchronized at step 520. The determination of whether the responding servers are synchronized may be made in accordance with the manners described hereinabove with respect to FIG. 4B.

If any packets have been received from synchronized servers, the time sync module 310 may average the network times from these servers at step 525. The time sync module 310 may also calculate a standard deviation of the network times at step 530. At step 535, the time sync module 310 may scan through the ordered list of synchronized servers according to their receipt order and select the first synchronized server that falls within a predetermined multiple of the standard deviation at step 540. The predetermined multiple of the standard deviation may be selected according to individual implementations and may vary according to various considerations, e.g., the level of accuracy required of the system clock in the network device. Thus, for example, where a system clock implementation requires a high level of accuracy, the predetermined multiple of the standard deviation may be set relatively low.

At step 545, the network time from the server selected at step 540 may be applied to the system clock of the network device. The time sync module 310 may then be configured to return to the idle state at step 405.

If none of the servers are synchronized (step 520), the time sync module 310 may be configured to average the network times from the responding non-synchronized servers at step 550. The time sync module 310 may also calculate a standard deviation of the network times at step 555. At step 560, the time sync module 310 may scan through the ordered list of non-synchronized servers according to their receipt order and select the first non-synchronized server that falls within a predetermined multiple of the standard deviation at step 565. The predetermined multiple of the standard deviation may be selected according to individual implementations and may vary according to various considerations, e.g., the level of accuracy required of the system clock in the network device. Thus, for example, where a system clock implementation requires a high level of accuracy, the predetermined multiple of the standard deviation may be set relatively low.

At step 570, the network time from the server selected at step 565 may be applied to the system clock of the network device. The time sync module 310 may then be configured to return to the idle state at step 405.

Figure 6:
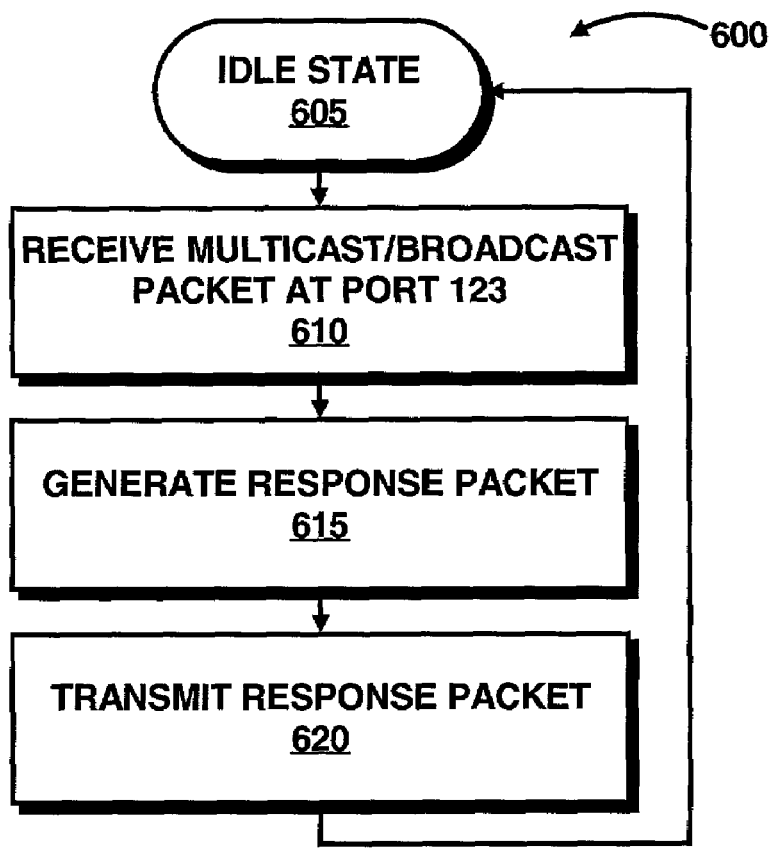
FIG. 6 illustrates a flow diagram illustrating a manner of operating a server according to an embodiment of the invention.

FIG. 6 illustrates an exemplary flow diagram for an operational mode 600 of a server, e.g., server 20 shown in FIG. 1 according to an embodiment of the invention. It should be readily apparent to those of ordinary skill in the art that the operational mode 600 represents a generalized illustration and that other steps may be added or existing steps may be removed or modified without departing from the scope of the present invention.

The steps illustrated in the operational mode 600 may be contained as a utility, program, or subprogram, in any desired computer accessible medium. In addition, the operational mode 600 may be embodied by a computer program, which can exist in a variety of forms both active and inactive. For example, the operational mode 600 may exist as a software program comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

A server, e.g., server 20, may be in an idle state at step 605. At step 610, the server may receive a request for a time synchronization, e.g., from time sync module 310. This request may be in any reasonably suitable format, e.g., multicast, broadcast, or the like. In response to the request, the server may generate a response packet including, for example, the network time and the server address, for transmission to the requesting network device at step 615. At step 620, the server may transmit the response packet to the network device where it may be received by the time sync module 310. The server may then return to the idle state at step 605.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for synchronizing a system clock in a client with a network time from a server, said method comprising:
   transmitting a request packet;
   receiving one or more data packets from at least one server in response to the request packet, each data packet including a network time;
   analyzing the one or more data packets from the at least one server to determine if the server is time synchronized or not time synchronized;
   categorizing each data packet received from a server that is time synchronized into synchronized group;
   categorizing each data packet received from a server that is not time synchronized into a non-synchronized group;
   ordering the data packets within each of the synchronized group and the non-synchronized group on the basis of order of receipt;
   averaging the network times of the data packets within the synchronized group;
   calculating a standard deviation of the network times of the data packets within the synchronized group;
   scanning through the ordered data packets within the synchronized group; and selecting a first synchronized data packet that falls within a predetermined multiple of the calculated standard deviation.

2. The method according to claim 1, further comprising: applying a network time from the selected data packet to the system clock in the client.

3. The method according to claim 1, wherein the step of transmitting the request packet comprises performing a multicast of the request packet.

4. The method according to claim 1, further comprising: awaiting responses from the at least one server in response to a timeout value not expiring.

5. The method according to claim 4, further comprising: performing a broadcast of the request packet in response to the timeout value expiring.

6. The method according to claim 1, further comprising: averaging the network times of the data packets of the non-synchronized group;
   calculating a standard deviation of the network times from the data packets within the non-synchronized group;
   scanning through the ordered data packets within the non-synchronized group; and
   selecting a first non-synchronized data packet that falls within a predetermined multiple of the calculated standard deviation.

7. The method according to claim 6, further comprising applying the network time from the selected non-synchronized data packet to synchronize the system clock on the client.

8. An apparatus for synchronizing a system clock in a client, said apparatus comprising:
   means for transmitting a request for time synchronization;
   means for receiving responses from a plurality of servers, each response including a network time;
   means for analyzing the responses to determine whether any of the responses is from a synchronized server, wherein any synchronized server is defined by a time synchronized server,
   means for determining the order of receipt of the responses;
   means for grouping each response from a time-synchronized server into synchronized group, and each response not from a time-synchronized server into a non-synchronized group, wherein each group is ordered in accordance with the order of receipt of the responses;
   means for averaging the network times of the responses within the synchronized group;
   means for calculating a standard deviation of the network times of the responses within the synchronized group;
   means for scanning through the ordered synchronized group; and
   means for selecting the first synchronized response that falls within a predetermined multiple of the calculated standard deviation.

9. The apparatus according to claim 8, further comprising means for applying the network time from the selected synchronized response to the system clock in the client.

10. The apparatus according to claim 8, further comprising:
    means for averaging the network times of the responses within the non-synchronized group;
    means for calculating a standard deviation of the network times of the response within the non-synchronized group;
    means for scanning through the ordered non-synchronized group; and
    means for selecting a first non-synchronized response that falls within a predetermined multiple of the calculated standard deviation.

11. The apparatus according to claim 10, further comprising:
    means for applying the network time from the selected non-synchronized response to the system clock on the client.

12. A system for synchronizing a system clock in a client, said system comprising a time sync module configured for storage and execution on said client, wherein said time sync module is configured to:
    transmit a request for time to one or more servers;
    receive responses from the one or more servers;
    analyze the responses from the one or more servers to determine whether a response is a synchronized response from a server that is time-synchronized, or a non-synchronized response from a server that is not time-synchronized;
    store ordered groups of synchronized responses into a synchronized group, and non-synchronized responses into a non-synchronized group, each group organized in the order of receipt of the responses;
    average the network times of the responses within the synchronized group;
    calculate a standard deviation of the network times of the responses within the synchronized group;
    scan through the ordered group of synchronized responses and select a first synchronized response that falls within a predetermined multiple of the calculated standard deviation; and apply the network time from the selected synchronized response to the system clock in the client.

13. The system according to claim 12, further comprising:

a network; and a plurality of servers;

wherein the time sync module is configured to transmit at least one of a multicast and a broadcast request for time synchronization to the plurality of servers through the network.

14. The system according to claim 12, wherein said time sync module is further configured to store a response from a first non-synchronized server to respond in response to no synchronized servers responding.

15. The system according to claim 14, wherein said time sync module is further configured to apply the network time from the stored data packet in response to no further responses from the one or more servers being received.

16. The system according to claim 15, wherein said time sync module is further configured to apply the network time from the first synchronized server to synchronize the system clock in the client.

17. The system according to claim 12, wherein said time sync module is further configured to:

average the network times of the responses within the non-synchronized group;

calculate a standard deviation of the network times of the responses within the non-synchronized group;

scan through the ordered list of non-synchronized responses and select a first non-synchronized response that falls within a predetermined multiple of the calculated standard deviation; and apply the network time from the selected non-synchronized response to the system clock in the network device.

18. A computer readable storage medium on which is embedded one or more computer programs operable by a client device, said one or more computer programs implementing a method, said one or more computer programs comprising a set of instructions for:

transmitting a request packet;

receiving one or more responses from at least one server in response to the request packet, each response including a network time;

analyzing the responses from the at least one server to determine whether the response is a synchronized response from a server that is time-synchronized, or a non-synchronized response from a server that is not time-synchronized;

categorizing each response received from a time-synchronized server into a synchronized group, and each response not received from a synchronized server into a non-synchronized group;

ordering the responses within each of the synchronized group and the non-synchronized group on the basis of order of receipt;

averaging the network times of the responses within the synchronized group;

calculating a standard deviation of the network times of the responses within the synchronized group;

scanning through the ordered responses within the synchronized group; and selecting a first synchronized response that falls within a predetermined multiple of the calculated standard deviation.

19. The computer readable storage medium according to claim 18, the one or more computer programs further comprising a set of instructions for:

applying the network time from the selected synchronized response to a clock of the client device.

20. The computer readable storage medium according to claim 18, the one or more computer programs further comprising a set of instructions for:

averaging the network times of the responses within the non-synchronized group;

calculating a standard deviation of the network times of the responses within the non-synchronized group, scanning through the ordered response within the non-synchronized group; and selecting a first non-synchronized response that falls within a predetermined multiple of the calculated standard deviation.

21. The computer readable storage medium according to claim 20, the one or more computer programs further comprising a set of instructions for:

applying the network time from the selected non-synchronized response to a clock of the client device.

* * * * *